(12) United States Patent
Fink et al.

(10) Patent No.: US 6,734,222 B2
(45) Date of Patent: May 11, 2004

(54) ADHESIVES CONTAINING POLYVINYL ALKYL ETHERS

(75) Inventors: Ralf Fink, Schifferstadt (DE); Karl-Heinz Schumacher, Neustadt (DE); Uwe Düsterwald, Queidersbach (DE); Christelle Staller, Seltz (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 126 days.

(21) Appl. No.: 10/056,116

(22) Filed: Jan. 28, 2002

(65) Prior Publication Data

US 2002/0137846 A1 Sep. 26, 2002

(30) Foreign Application Priority Data

Feb. 2, 2001 (DE) .......................... 101 05 278

(51) Int. Cl.$^7$ .............. C08F 2/46; C08L 61/00
(52) U.S. Cl. ............ 522/108; 522/104; 522/107; 522/109; 522/110; 522/150; 522/153; 522/154; 522/904; 428/355 R; 428/355 AC; 428/355 EN; 525/191; 525/221; 525/222; 525/153
(58) Field of Search ................. 522/904, 104, 522/107, 108, 109, 110, 150, 153, 154; 525/153, 191, 221, 222; 428/355 AC, 355 EN, 355 R

(56) References Cited

U.S. PATENT DOCUMENTS

| | | | |
|---|---|---|---|
| 4,042,768 A | | 8/1977 | Muller et al. |
| 4,469,774 A | * | 9/1984 | Lee .......... 430/270.1 |
| 4,506,003 A | * | 3/1985 | Ruckert et al. ......... 430/270.1 |
| 5,073,611 A | * | 12/1991 | Rehmer et al. ........... 526/208 |
| 5,128,286 A | | 7/1992 | Funayama et al. |
| 5,223,645 A | | 6/1993 | Barwich et al. |
| 5,248,805 A | | 9/1993 | Boettcher et al. |
| 5,264,533 A | | 11/1993 | Rehmer et al. |
| 5,389,699 A | | 2/1995 | Rehmer et al. |

FOREIGN PATENT DOCUMENTS

| | | |
|---|---|---|
| AT | 320 104 | 1/1975 |
| DE | 1 569 922 | 7/1970 |
| DE | 2 039 079 | 2/1972 |
| DE | 2 236 575 | 2/1974 |
| DE | 38 44 444 | 12/1988 |
| DE | 4037079 | 11/1990 |
| DE | 44 32 876 | 4/1996 |
| EP | 0 103 407 | 8/1983 |
| EP | 0 155 557 | 9/1985 |
| EP | 0 330 272 | 2/1989 |
| EP | 0 346 734 | 6/1989 |
| EP | 0 377 199 | 12/1989 |
| GB | 1 078 942 | 8/1967 |
| GB | 1 280 631 | 7/1972 |
| GB | 1 322 721 | 7/1973 |
| WO | WO 96/26221 | 8/1996 |

OTHER PUBLICATIONS

Patent Abstracts of Japan, JP 58 067776, Apr. 22, 1983.

* cited by examiner

*Primary Examiner*—James J. Seidleck
*Assistant Examiner*—Sanza L. McClendon
(74) *Attorney, Agent, or Firm*—Oblon, Spivak, McClelland, Maier & Neustadt, P.C.

(57) ABSTRACT

The invention relates to a mixture, containing

A) a polymer, which consists to an extent of at least 40 wt % of $C_1$–$C_{18}$ alkyl (meth)acrylates (referred to herein as polyacrylates) and B) a homopolymer or copolymer of vinyl alkyl ether (referred to herein as polyvinyl alkyl ether), which consists, to an extent of at least 70 wt %, of structural units of the following formula,

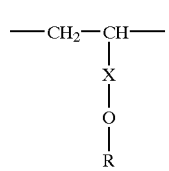

I in which X stands for a single bond or a $C_1$–$C_3$ alkyl group and R for a $C_1$–$C_6$ alkyl group.

19 Claims, No Drawings

ADHESIVES CONTAINING POLYVINYL ALKYL ETHERS

BACKGROUND OF THE INVENTION

1. Field of the Invention

The invention relates to a mixture containing:

A) a polymer, which consists to an extent of at least 40 wt % of $C_1$–$C_{18}$ alkyl (meth)acrylates (referred to below as polyacrylates) and B) a homopolymer or copolymer of vinyl alkyl ether (referred to below as polyvinyl alkyl ether), which consists to an extent of at least 70 wt % of structural units of the following formula

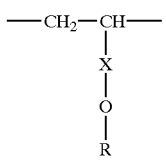

in which X stands for a single bond or a $C_1$–$C_3$ alkylene group and R for a $C_1$–$C_6$ alkyl group.

The invention also relates to the use of said mixture as an adhesive or a hot-melt adhesive, particularly for the production of self-adherent articles incorporating flexible PVC as support material.

2. Description of the Background

The manufacture of self-adherent labels and tapes and also printed films for exterior applications presently involves, in many cases, the use of soft PVC films coated with a self-adhesive. In this case, use is made, inter alia, of PVC films containing low-molecular plasticizers based on phthalate. One problem arising from the use of these plasticizers is that the plasticizer can migrate from the film into the self-adhesive. The application-technological adhesive properties are greatly reduced as a result. Both the cohesion of the adhesive and the adhesion of the adhesive to the surface to which the label or film is stuck can be distinctly reduced on account of the migration of the plasticizer into the adhesive.

Attempts at solving this problem hitherto described in the literature involve the use of barrier layers (EP 103,407) to prevent or reduce such migration, or the use of crosslinking agents (EP 330,272) or specific comonomers (WO 96/26221).

The solutions previous proposed call for elaborate changes to be made to the polymer system by appropriate selection of specific comonomers or demand elaborate pretreatment of the support material.

The present invention relates to adhesives which are also suitable for use on support materials of flexible PVC and which are capable of adequately preventing or reducing the migration of plasticizers or at least of alleviating the results of such migration.

Accordingly, we have found the mixtures defined above and the use thereof.

SUMMARY OF THE INVENTION

The mixture of the invention necessarily contains a polyacrylate A) and a poly(alkyl vinyl ether) B).

The polyacrylate consists to an extent of at least 40 wt %, preferably to an extent of at least 60 wt %, and more preferably to an extent of at least 80 wt %, of $C_1$–$C_{18}$ alkyl (meth)acrylates.

Particular mention may be made of $C_1$–$C_{18}$ alkyl (meth)acrylates, eg, methyl (meth)acrylate, ethyl (meth)acrylate, n-butyl (meth)acrylate, and 2-ethylhexyl (meth)acrylate.

DETAILED DESCRIPTION OF THE PREFERRED EMBODIMENTS

The mixture preferably contains a photoinitiator to make the polyacrylate uv-crosslinkable. To render the mixture of the invention uv-crosslinkable, a photoinitiator can be added thereto. Alternatively, the photoinitiator can be bonded to the polyacrylate.

By irradiation with high-energy light, particularly UV light, the photoinitiator causes crosslinking of the polyacrylate, preferably by a chemical grafting reaction of the photoinitiator with an adjacent polymer chain. In particular, crosslinking can take place by insertion of a carbonyl group of the photoinitiator into an adjacent carbon-hydrogen bond to produce a —C—C—O—H group.

The mixture of the invention contains preferably from 0.0001 to 1 mol, more preferably from 0.0002 to 0.1 mol, and most preferably from 0.0003 to 0.01 mol, of the photoinitiator or the group of molecules bonded to the polyacrylate and acting as photoinitiator, per 100 g of polyacrylate.

The photoinitiator comprises, for example, acetophenone, benzoin ether, benzyl dialkyl ketols or derivatives thereof.

Preferably, the photoinitiator is bonded to the polyacrylate.

More preferably, the photoinitiator is one which has been built into the polymer chain by free-radical copolymerization. Preferably, the photoinitiator additionally contains an acrylic or methacrylic group.

Suitable copolymerizable photoinitiators are acetophenone or benzophenone derivatives containing more than one, but preferably one, ethylenically unsaturated group. The ethylenically unsaturated group is preferably a (meth)acrylic group.

The ethylenically unsaturated group can be bonded directly to the phenyl ring of the acetophenone or benzophenone derivative. Generally, a spacer group is located between the phenyl ring and the ethylenically unsaturated group.

The spacer group can contain, eg, up to 100 carbon atoms.

Suitable acetophenone or benzophenone derivatives are described in, eg, EP-A 346,734, EP-A 377,199 (claim 1), DE-A 4,037,079 (claim 1), and DE-A 3,844,444 (claim 1) and are included herein by reference. Preferred acetophenone and benzophenone derivatives are those of the formula

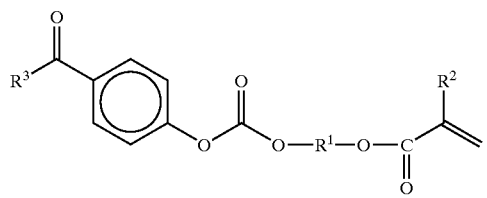

in which $R^1$ stands for an organic radical containing up to 30 carbons, $R^2$ stands for a hydrogen atom or a methyl group and $R^3$ stands for an optionally substituted phenyl group or a $C_1$–$C_4$ alkyl group.

$R^1$ very preferably stands for an alkylene group, in particular a $C_2$–$C_8$ alkylene group.

$R^3$ very preferably stands for a methyl group or a phenyl group.

Examples of other monomers of which the polyacrylate can be composed are vinyl esters of carboxylic acids containing up to 20 carbons, vinyl aromatic compounds containing up to 20 carbons, ethylenically unsaturated nitrites, vinyl halides, vinyl ethers of alcohols containing from 1 to 10 carbons, aliphatic hydrocarbons containing from 2 to 8 carbons and 1 or 2 double bonds, or mixtures of these monomers.

Examples of suitable vinylaromatic compounds are vinyl toluene α- and π-methylstyrenes, α-butylstyrene, 4-n-butylstyrene, 4-n-de-cylstyrene, and preferably styrene. Examples of nitrites are acrylonitrile and methacrylonitrile.

The vinyl halides are ethylenically unsaturated compounds that are substituted by chlorine, fluorine or bromine, preferably vinyl chloride and vinylidene chloride.

Examples of suitable vinyl ethers are vinyl methyl ether, vinyl ethyl ether or vinyl isobutyl ether. Preference is given to a vinyl ether of alcohols containing from 1 to 4 carbons.

As examples of hydrocarbons containing from 2 to 8 carbons and two olefinic double bonds there may be mentioned butadiene, isoprene and chloroprene.

Other monomers which are particularly suitable are monomers containing carboxylic, sulfonic or phosphonic acid groups. Preference is given to carboxylic acid groups. Examples thereof are acrylic acid, methacrylic acid, itaconic acid, maleic acid, and fumaric acid.

Other monomers are eg monomers containing hydroxyl groups, particularly $C_1$–$C_{10}$ hydroxyalkyl (meth)acrylates, and (meth)acrylamide.

Mention may also be made of phenyloxyethyl glycol mono(meth)acrylate, glycidyl acrylate, glycidyl methacrylate, and amino (meth)acrylates such as 2-aminoethyl (meth)acrylate.

Monomers containing, in addition to the double bond, other functional groups, such as isocyanate, amino, hydroxy, amide or glycidyl groups, can improve the adhesion to substrates, for example.

The polyacrylate preferably has a K value of from 30 to 80 and more preferably from 40 to 60, measured in tetrahydrofuran (1% strength solution, 21° C.).

The Fikentscher K-value is an indication of the molecular weight and viscosity of the polymer.

The glass-transition temperature ($T_g$) of the polyacrylate is preferably from −60° to +10° C., more preferably from −55° to 0° C., and most preferably from −55° to −10° C.

The glass-transition temperature of the polyacrylate can be determined by conventional methods such as differential thermal analysis or differential scanning calorimetry (cf, eg, ASTM 3418/82, "midpoint temperature").

The polyacrylates can be produced by copolymerization of the monomeric components using the conventional polymerization initiators and, optionally, modifiers, polymerization being carried out at the usual temperatures in substance, in emulsion, eg, in water or liquid hydrocarbons, or in solution. Preferably, the novel copolymers are produced by polymerization of the monomers in solvents (solvent polymerization), particularly in solvents boiling at from 50° to 150° C., and preferably from 60° to 120° C., using the conventional amount of polymerization initiators, which is generally from 0.01 to 10 wt %, and in particular from 0.1 to 4 wt %, based on the total weight of the monomers. Particularly suitable solvents are alcohols, such as methanol, ethanol, n-propanol and isopropanol, n-butanol and isobutanol, preferably isopropanol and/or isobutyl alcohol and also hydrocarbons such as toluene and particularly gasolenes having a boiling range of from 60° to 120° C. Furthermore ketones, such as acetone, methyl ethyl ketone, methylisobutyl ketone and esters, such as ethyl acetates, and also mixtures of solvents of said types can be used, preference being given to mixtures containing isopropanol and/or isobutyl alcohol in concentrations of from 5 to 95, preferably from 10 to 80 wt %, and more preferably from 25 to 60 wt %, based on the solvent mixture used.

Suitable polymerization initiators for said solvent polymerization are, for example, azo compounds, ketone peroxides, and alkyl peroxides.

Following polymerization in solution, the solvents may be optionally separated under reduced pressure at an elevated temperature, for example a temperature in the range of from 100° to 150° C. The polymers can then be used in a solventless state, ie as a melt.

In some cases it is also of advantage to make the novel uv-crosslinkable polymers by bulk polymerization, ie, without the use of added solvent, this being carried out batchwise or continuously, as described, for example, in U.S. Pat. No. 4,042,768.

The polyacrylates used in the mixture of the invention are preferably free from solvent. A residual content of solvents, eg organic solvents and/or water may, however, be present in a concentration below 5 parts by weight, preferably below 2 parts by weight, more preferably below 1 parts by weight, and most preferably below 0.5 parts by weight, of solvent, based on 100 parts by weight of the sum of polyacrylate a) and polyvinyl alkyl ether B).

In addition to polyacrylate A) the mixture of the invention contains a homopolymer or copolymer of vinyl alkyl ether, referred to below as polyvinyl alkyl ether B).

The polyvinyl alkyl ether consists to an extent of at least 70 wt %, preferably to an extent of at least 85 wt %, and more preferably to an extent of at least 95 wt %, of structural units of the formula

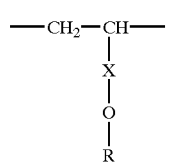

I in which X stands for a single bond (ie X is omitted) or a $C_1$–$C_3$ alkylene group,

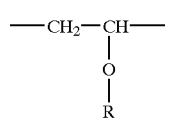

II and R has the meaning defined above.

Preferably, R stands for a $C_1$–$C_3$ alkyl group, more preferably for methyl, ethyl, propyl, and isopropyl, and most preferably for ethyl.

Such polyvinyl alkyl ethers are obtained in known manner, eg, by cationic polymerization of vinyl alkyl ethers (eg, vinyl methyl ether, vinyl ethyl ether, vinyl propyl ether, or vinyl isopropyl ethers.

It is possible to copolymerize different vinyl alkyl ethers, so that the polyvinyl alkyl ether can contain different structural units of formula I.

Suitable comonomers include, for example, (meth)acrylates.

The polyvinyl alkyl ether preferably has a Fikentscher K-value of from 10 to 90, more preferably from 20 to 70, and most preferably from 35 to 70 (1% strength solution, solvent tetrahydrofuran, 21° C.).

Production of the polyvinyl alkyl ether can be carried out by, eg, solvent polymerization in organic solvents or mass polymerization (ie, without any solvent). Preference is given to polyvinyl alkyl ethers produced without solvent.

Suitable polyvinyl ethers are available, eg, under the trade name Lutonal®, sold by BASF.

To produce the mixture of the invention, polyacrylate A) and polyvinyl ether B) can be intermixed at any time.

In particular, the polyvinyl ether can be added to the solution of the polyacrylate obtained after solvent polymerization of the polyacrylate. If desired, the solvent may then be removed (see above).

The polyvinyl ether can be added to the polymerization mixture before or during production of the polyacrylate, if desired.

In all cases, preference is given to the manufacture of the polyacrylate by solvent polymerization, the addition of polyvinyl ether prior to removal of the solvent, followed by removal of the above solvent (as described above).

When this method is used, mixtures possessing particularly advantageous properties are obtained. This is possibly due to the fact that the polyvinyl ether may be at least partially chemically attached to the polyacrylate, for example by grafting reactions.

The content of polyvinyl ether in the mixture of the invention is preferably from 0.1 to 60 parts by weight, more preferably from 5 to 50 parts by weight, and most preferably from 10 to 40 parts by weight based on 100 parts by weight of A)+B) (solid, ie, without solvent).

If the mixture is to contain a photoinitiator and this photoinitiator is not bonded to polyacrylate A, eg, by copolymerization, the photoinitiator can be added at any time.

The mixture of the invention can contain further components, for example additives, such as fillers, dyes, levelling auxiliaries and, in particular, tackifiers (tackifying resins).

Tackifiers are, for example, natural resins, such as colophoniums and derivatives thereof resulting from disproportionation, isomerization, polymerization, dimerization, or hydrogenation. These can be present in their salt form (with, eg, monovalent or multivalent counterions (cations), or preferably in their esterified form. The alcohols which are used for the esterification can be monohydric or polyhydric. Examples are methanol, ethanediol, diethylene glycol, triethylene glycol, 1,2,3-propanethiol, and pentaerythritol.

Furthermore, use is also made of hydrocarbon resins, eg, coumaron-indene resins, polyterpene resins, hydrocarbon resins based on unsaturated hydrocarbons, such as butadiene, pentene, methylbutene, isoprene, piperylene, divinylmethane, pentadiene, cyclopentene, cyclopentadiene, cyclohexadiene, styrene, α-methylstyrene, or vinyl toluene.

Polyacrylates exhibiting a low molecular weight are also being increasingly used as tackifiers. Preferably, these polyacrylates have a weight-average molecular weight $M_w$ below 30,000. The polyacrylates preferably comprise $C_1$–$C_8$ alkyl (meth)acrylates to an extent of at least 60 wt %, preferably at least 80 wt %.

Preferred tackifiers are natural or chemically modified colophoniums. Colophoniums predominantly consist of abietic acid or abietic acid derivatives.

The weight of the tackifiers is preferably from 5 to 100 parts by weight and more preferably from 10 to 50 parts by weight, based on 100 parts by weight of polyacrylate (solid/solid).

The mixture can be used as an adhesive, particularly as a self-adhesive.

In particular, the mixture can also be used as a hot-melt adhesive, ie, as a substantially solventless mixture, which is applied to the desired substrate from the melt.

The mixture is particularly suitable for use as adhesive for bonding substrates, wherein at least one of the substrate surfaces to be bonded is of flexible PVC. For example, the adhesive can be applied to a support, eg, of paper or plastics material, and the support (eg, a label, adhesive tape or film) thus coated can be stuck to a substrate of flexible PVC (eg, window profiles etc.).

In particular, the adhesive is a uv-crosslinkable adhesive, self-adhesive or hot-melt adhesive.

The adhesives or hot-melt adhesives of the invention are particularly suitable for the production of self-adherent articles, such as labels, adhesive tapes, or adhesive films, eg, protective films.

The self-adherent articles generally comprise a support and a layer of the adhesive applied to one or both sides, preferably to one side.

The support material may be, for example, paper, a plastic film of a polyolefin or polyvinyl chloride, preferably polyvinyl chloride, and more preferably flexible PVC.

The mixture of the invention is particularly advantageous when used on flexible PVC as support material.

By flexible PVC we mean polyvinyl chloride having a content of plasticizer and a lowered softening point. Common plasticizers are, for example, phthalates, epoxides, and adipates. The content of plasticizer in flexible PVC is, for example, more than 10 wt %, and in particular more than 20 wt %.

In the case of flexible PVC, plasticizers can migrate into the adhesive layer and considerably impair the properties of the adhesive. When use is made of the mixture of the invention, migration of the plasticizers has no or little effect on the properties of the adhesive.

Thus the present invention relates, in particular, to self-adherent articles having flexible PVC as support material and, applied thereto, a coating of an adhesive layer of the above mixture.

Production of the adhesive layer on the support material can be effected by coating the support material in conventional manner.

Preferably, the above mixtures are used as hot-melt adhesive, ie, coating is effected from the melt, preferably at a temperature of the mixture of from 60° to 200° C., and particularly from 90° to 160° C. Preferred layer thicknesses are from 2 to 200 µm, more preferably from 5 to 80 µm, and most preferably from 10 to 80 µm.

In the preferred embodiment involving the use of uv-crosslinkable polyacrylates, coating is followed by irradiation with high-energy light, particularly UV light, so that crosslinking occurs.

Generally, the coated substrates are laid, for this purpose, on a conveyor belt, and the conveyor belt is caused to move past a source of radiation, eg, a UV lamp.

The degree of crosslinking of the polymers depends on the duration and intensity of the irradiation.

Preferably, the radiant energy in the wavelength range of from 250 to 260 nm is from 3 to 70 mJ/cm² of irradiated surface (as determined using the UV Power Puck®).

The resulting, coated substrates are preferably used as self-adherent articles, such as labels, pressure-sensitive tapes, or protective films.

The resulting, uv-crosslinked adhesive coatings have good application-technological properties, eg, very good adhesion and high structural strength.

EXAMPLES

Polymers Used:

Polyacrylate: ac Resin® A 203 UV, a uv-crosslinkable polyacrylate having a glass transition temperature of –35° C. and a copolymerized benzophenone initiator.

Polyvinyl Alkyl Ethers

Lutonal® M40, a polyvinyl methyl ether (K value 40)
Lutonal® A 25, a polyvinyl ethyl ether (K value 25)
Lutonal® I 60, a polyvinyl isopropyl ether (K value 60)
Luronal® A 50, a polyvinyl ethyl ether (K value 50)

Production of the Mixture

Following polymerization of the polyacrylate in isobutanol, the Lutonal was added and then the solvent removed by distillation.

Utilitarian Tests

Flexible PVC films were coated with the mixtures listed in the table, at from 120° to 140° C. (layer thickness 25 g/m²).

Following coating, the adhesive layer was crosslinked with the UV dose stated.

The adhesive tapes (width 2.5 cm) were then stuck to a steel surface and the peel strength determined (immediately and after leaving for 3 days at 70° C., readings in N/2.5 cm).

In the peeling strength test, the contact time was 20 minutes and the peeling rate 300 mm/min.

The water resistance (blushing) was also tested. For this purpose the adhesive film was immersed in water and the time taken for opacity to appear was noted.

Results are listed in the following table.

| Mixtures* | UV-C dose (250–260 nm) [mJ/cm²] | Peeling strength immediately | Peeling strength 3 days at 70° C. | Blushing 24 h |
|---|---|---|---|---|
| 100 ac Resin A 203 UV + 30 Lutonal M 40 | 10 | 10.4 | 9.3 | 20 min |
| 100 ac Resin A 203 UV + 30 Lutonal A 25 | 10 | 21.3 | 11.3 | >24 h |
| 100 ac Resin A 203 UV + 30 Lutonal A 50 | 10 | 15.8 | 9.5 | >24 h |
| 100 ac Resin A 203 UV + 40 Lutonal I 60 | 5 | 21.7 | 19.4 | >24 h |
| ac Resin A 203 UV | 10 | 6 | 1.5 | >24 h |
| ac Resin A 203 UV | 5 | 8.5 | 3.9 | >24 h |

*the numerals indicate parts by weight

What is claimed is:

1. A mixture, comprising:
   A) a polymer, which consists to an extent of at least 40 wt % of $C_1$–$C_{18}$ alkyl (meth)acrylates; and
   B) a homopolymer or copolymer of vinyl alkyl ether, which consists to an extent of at least 70 wt % of structural units of the following formula:

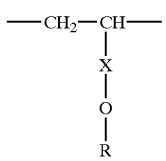

in which X stands for a single bond or a $C_1$–$C_3$ alkylene group and R for a $C_1$–$C_6$ alkyl group; wherein the mixture has a water content or organic solvent content of less than 5 parts by weight based on 100 parts by weight of the sum of poly(meth)acrylate (A) and polyvinyl alkyl ether (B).

2. The mixture as defined in claim 1, wherein the poly(meth)acrylate has a Fikentscher K-value of ringing from 30 to 80 (in 1% strength solution, solvent tetrahydrofuran, 21° C.).

3. The mixture as defined in claim 1, wherein the mixture contains a photoinitiator.

4. The mixture as defined in claim 1, wherein the photoinitiator is bonded to the poly(meth)acrylate.

5. The mixture as defined in claim 1, wherein, in the polyvinyl vinyl alkyl ether of formula I, X stands for a single bond and R for a $C_1$–$C_4$ alkyl group.

6. The mixture as defined in claim 1, wherein the polyvinyl alkyl ether has a Fikentscher K-value ranging from 10 to 90 (in 1% strength solution, solvent tetrahydrofuran, 21° C.).

7. The mixture as defined in claim 1, wherein the proportion of polyvinyl alkyl ether ranges from 0.1 to 60 parts by weight, based on 100 parts by weight of poly(meth) acrylate (A).

8. A method of bonding materials to each other, comprising:
   bonding said materials together with the mixture as defined in claim 1 as an adhesive.

9. The method as defined in claim 8, wherein the adhesive is a hot-melt adhesive.

10. A method as defined in claim 8, wherein at least one of the surfaces of the materials to be bonded by the adhesive is of a flexible PVC.

11. A method of manufacturing a self-adherent article, comprising:
    incorporating said mixture as defined in claim 1 as a self-adhesive into the self-adherent article which incorporates a flexible PVC as a support material.

12. A process for the production of self-adherent articles, comprising:
    applying to a substrate the mixture as defined in claim 1, followed by
    cross-linking the applied adhesive by means of UV light.

13. The process as defined in claim 12, wherein the mixture is applied to the substrate from the melt at a temperature ranging from 100° to 160° C.

14. A self-adherent article obtained by a process as defined in claim 1.

15. The mixture as defined in claim 1, which contains from 0.0001 to 1 mole of the photoinitiator per 100 g of the poly(meth)acrylate.

16. The mixture as defined in claim 15, which contains from 0.0002 to 0.1 mole of the photoinitiator per 100 g of the poly(meth)acrylate.

17. The method of claim 11, wherein the adhesive is a hot-melt adhesive.

18. The process of claim 12, wherein the self-adherent article is a label, a tape or a large-area film.

19. A mixture, comprising:
    A) a polymer, which consists to an extent of at least 40 wt % of $C_1$–$C_{18}$ alkyl (meth)acrylates prepared by solvent polymerization of a $C_1$–$C_{18}$ alkyl (meth)acrylate; and
    B) a homopolymer or copolymer of vinyl alkyl ether, which consists to an extent of at least 70 wt % of structural units of the following formula:

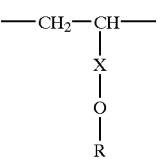

in which X stands for a single bond or a $C_1$–$C_3$ alkylene group and R for a $C_1$–$C_6$ alkyl group, the polymer of vinyl alkyl ether being added to the (meth)acrylate polymerization medium prior to removal of solvent from the medium.

* * * * *